United States Patent
Wu

(10) Patent No.: US 7,334,186 B2
(45) Date of Patent: Feb. 19, 2008

(54) SYSTEM AND METHOD FOR CREATION OF VIDEO ANNOTATIONS

(75) Inventor: Peng Wu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

(21) Appl. No.: 10/426,775

(22) Filed: Apr. 30, 2003

(65) Prior Publication Data

US 2004/0221227 A1 Nov. 4, 2004

(51) Int. Cl.
*G06F 17/00* (2006.01)
(52) U.S. Cl. .................................. 715/512; 725/44
(58) Field of Classification Search ............... 715/512; 725/44

See application file for complete search history.

(56) References Cited

U.S. PATENT DOCUMENTS

| 5,642,285 | A | 6/1997 | Woo et al. |
| 6,266,442 | B1 | 7/2001 | Laumeyer et al. |
| 6,564,263 | B1 * | 5/2003 | Bergman et al. ............ 709/231 |
| 6,813,618 | B1 * | 11/2004 | Loui et al. ..................... 707/5 |
| 6,956,573 | B1 * | 10/2005 | Bergen et al. .............. 345/473 |
| 2004/0114042 | A1 * | 6/2004 | Paolini et al. ......... 348/207.99 |

* cited by examiner

*Primary Examiner*—Doug Hutton
*Assistant Examiner*—Amelia Rutledge

(57) ABSTRACT

A system and method for annotating a video data stream integrates geographic location data into the video data stream. A site name is mapped from the geographic location data, and the site name is automatically assigned as a text label to the associated portion of the video data stream.

21 Claims, 6 Drawing Sheets

SYSTEM AND METHOD FOR CREATION OF VIDEO ANNOTATIONS

THE FIELD OF THE INVENTION

The present invention generally relates to summarizing of video material, and more particularly to the creation of annotations or labels in a video summarization system.

BACKGROUND OF THE INVENTION

Digital video is a rapidly growing element of the computer and telecommunication industries. Many companies, universities and even families already have large repositories of videos both in analog and digital formats. Examples include video used in broadcast news, training and education videos, security monitoring videos, and home videos. The fast evolution of digital video is changing the way many people capture and interact with multimedia, and in the process, it has brought about many new needs and applications.

One such application is video abstraction. Video abstraction, as the name implies, is a short summary of the content of a longer video sequence which provides users concise information about the content of the video sequence, while the essential message of the original is well preserved. Theoretically, a video abstract can be generated manually or automatically. However, due to the huge volumes of video data already in existence and the ever increasing amount of new video data being created, it is increasingly difficult to generate video abstracts manually. Thus, it is becoming more and more important to develop fully automated video analysis and processing tools so as to reduce the human involvement in the video abstraction process.

There are two fundamentally different kinds of video abstracts: still-image abstracts and moving-image abstracts. The still-image abstract, also called a video summary, is a small collection of salient images (known as keyframes) extracted or generated from the underlying video source. The moving-image abstract, also called video skimming, consists of a collection of image sequences, as well as the corresponding audio abstract extracted from the original sequence and is thus itself a video clip but of considerably shorter length than the video sequence from which it is derived. Generally, a still image abstract is easier and faster to create than a moving image abstract, since only visual information is utilized to generate the still image abstract, whereas a moving image abstract is created by incorporating/synchronizing audio or textual information into the moving abstract. Furthermore, the temporal order of all extracted representative frames can be displayed in a spatial order so that the users are able to grasp the video content more quickly from the still image abstract. Finally, when needed, the extracted still images can be easily printed out from the still image abstract.

While the use of video summarization is applicable to video sequences in any storage medium (tape, disc, etc.), one common storage medium of interest is DVD video discs. DVD video is dramatically changing the way people utilize multimedia information. The huge storage capacity of a DVD video disc provides an ideal storage place for still images, text, video and audio. The navigation features supported by DVD video format enable the interactive access of media contents. To accommodate the various media types that can be stored on DVD disc, there is an increasing need for a technology that can organize the media according to the DVD video format specifications and export such organized media content to the DVD disc. This technology is generally called "DVD authoring" and one essential task of DVD authoring is to create the DVD video title and navigation structure from the video source.

As explained in greater detail below, FIGS. 1a and 1b are illustrations of a video summary 10 as it may appear on a video display device 1, such as on a computer monitor or television. In the example illustrated, a video summary 10 of a video source is shown. The video source may be, for example, a DVD, a video stored on a hard drive, a video tape, or any other video storage medium. The video summary 10 structure consists primarily of two entities: titles 12 and chapters 14. Titles 12 and chapters 14 are used to organize the video content of the video source for interactive browsing. Titles 12 and chapters 14 segment the entire video sequence of the video source into meaningful pieces, with each title 12 and chapter 14 being an entry point for a particular piece of video.

In the example illustrated in FIGS. 1a and 1b, the video summary 10 may be used for browsing the entire content of the video source and quickly locating a desired section of the video. For example, when browsing the video, the user first sees the display of FIG. 1a, showing that the video is segmented into smaller sections (i.e., titles 12) labeled "Trip A", "Trip B" and "Trip C". The video content of each title 12 is determined by the particular video summarization technique used. To browse the content of the video to a greater level of detail, the user selects a title 12 of interest (in this example, the title 12 labeled "Trip B"). The chapters 14 that make-up the content of the selected title 12 are then displayed, as in FIG. 1b, where the title 12 labeled "Trip B" is shown to include chapters 14 labeled "Location A" and "Location B". The user may select a chapter 14 to view the underlying video sequence.

As shown in FIGS. 1a and 1b, each graphical representation of a title 12 or chapter 14 typically constitutes two parts: a representative image or keyframe 16 and a text label 18. The ideal keyframe 16 and text label 18 should capture the underlying video content and convey to the user what is in the underlying video document. Thus, it is desirable that the keyframe 16 and text label 18 capture the semantic focus of the video content. This is a challenging issue in the research areas of video analysis and video summarization.

To be able to automatically create the title-and-chapter structure with a meaningful representative image or keyframe 16 and a corresponding text label 18 from a video sequence is of great interest in DVD authoring. Applications which automatically select a representative image from a video document are known in the art. For example, in Hewlett Packard's MyDVD application, when a user elects to have a DVD created automatically from a video, a new chapter is created when a scene is detected based on a scene detection algorithm. A keyframe 16 is then extracted from each detected scene. The keyframe 16, which represents the underlying scene, is linked to a DVD navigation button so that the user can browse the keyframes 16 to quickly capture the content of the video sequence and click the relevant button to watch the corresponding scene.

Presently, labels 18 for annotating selected keyframes 16 are created manually or from video analysis. The manual creation is both time consuming and subjective, while creation from video analysis tends to be unreliable due to limitations in the video summarization algorithms. The process of video summarization is also slowed by either creating labels manually or requiring extensive video analysis. Thus, a need still exists for automatically creating a meaningful text label 18 to accompany the selected keyframe 16 images in a video summarization.

SUMMARY OF THE INVENTION

A system and method for annotating a video data stream is described herein, where at least one portion of the video data stream has associated geographic location data. A video document is created by integrating geographic location data into the video data stream. A site name is mapped from the geographic location data, and the site name is automatically assigned as a text label to the associated portion of the video data stream.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

A system and method for automatically creating a text label 18 for a video title-and-chapter structure (also referred to herein as a video summary) from a video sequence or document is described. Although described with respect to DVD authoring, it is understood that the invention described herein is not limited to use with DVD authoring. Rather, the invention may be employed in any video abstraction technique where the automatic creation of a text label is required or desired.

In general, video documents, and home videos in particular, are taken by highly mobile camcorders. Moreover, video documents often contain a plurality of video sequences taken at different sites (e.g., museums, schools, parks, etc.) having associated map locations and geographic locations. In accordance with the present invention, the map location and/or names of the sites where the video sequence was taken can be used in a natural and meaningful way to organize the content of the video document.

As used herein, the term "site" refers to the location where the video sequence was recorded. Depending upon the level of abstraction, a site may be, for example, Museum A, Restaurant B, Theater C, Park D, Street X, City Y, State Z, etc. The term "map location" refers to features found on maps, such as streets, cities, etc. The term "geographic location" refers to a latitude and longitude coordinate. Thus, a site will have a corresponding map location (but may not be explicitly named on a map), and the map location will have a corresponding geographic location. As used herein, a "site name" encompasses map locations (such as Street X, City Y or State Z), as well as more specific location names (such as Museum A, Restaurant B, Theater C, Park D) which may or may not appear on a map.

Figure 1A:
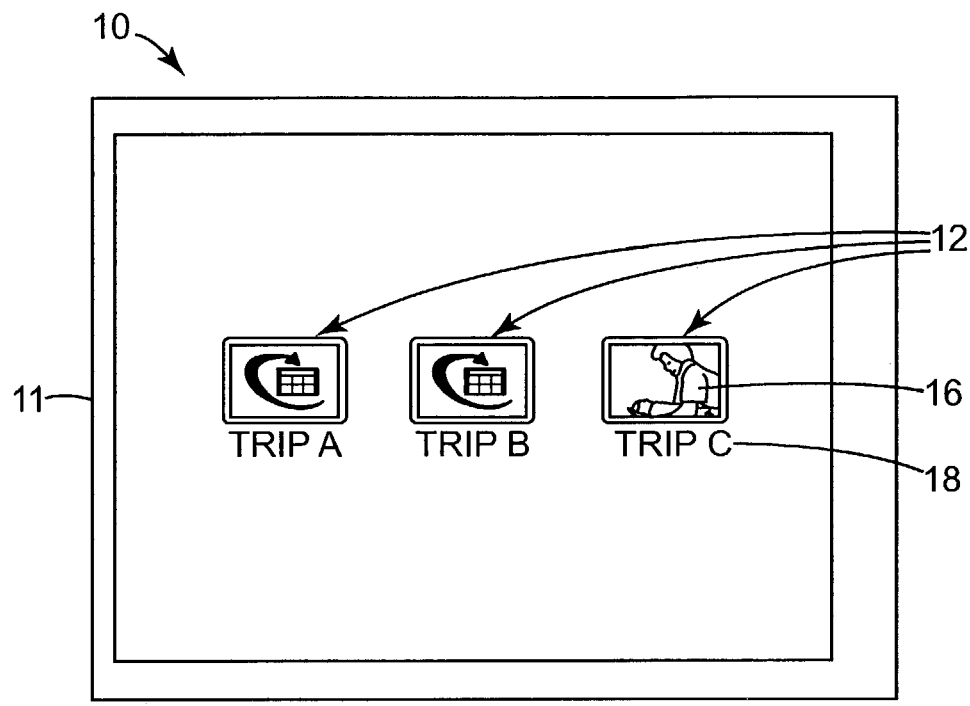
FIGS. 1*a* and 1*b* are examples of a video summary as shown on a video display device.
Figure 1B:
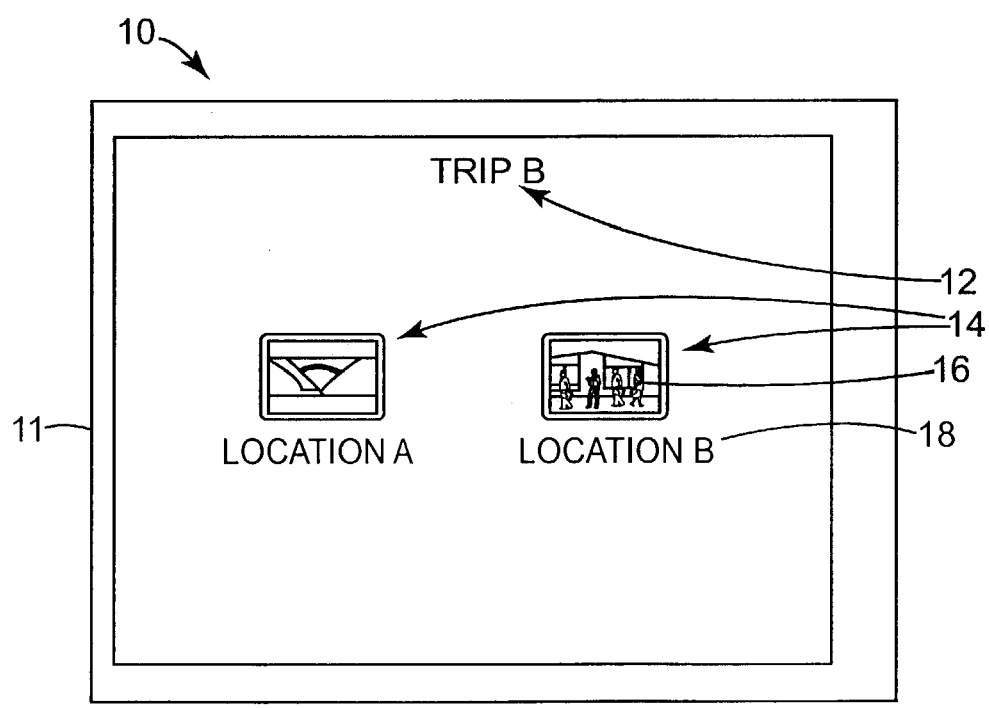
Figure 2A:
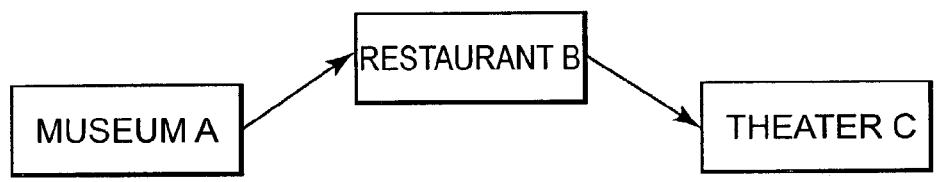
FIG. 2*a* is an example of the contents of a video document.
Figure 2B:
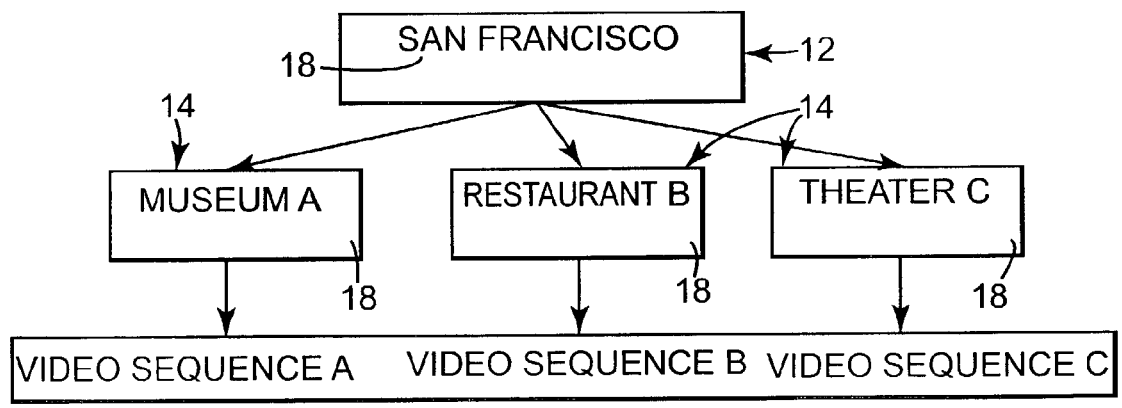
FIG. 2*b* is one embodiment of a video summary structure that navigates the video document illustrated in FIG. 2*a*, and that uses annotations according to the invention.

As an illustration, consider an imaginary tour of San Francisco (FIG. 2*a*). The tour visits multiple sites including Museum A, Restaurant B, and Theater C. At each of the sites, a video sequence is taken. An effective navigation structure using annotations or text labels 18 based on site names in accordance with the present invention is illustrated in FIG. 2*b* for a video document that includes the video sequences taken at each site of the San Francisco tour. As shown, the navigation structure has a title 12 that is composed of chapters 14 that in turn correspond to video sequences taken at each site of the tour. The text label 18 for the title 12 (a broader level of abstraction) uses a map location (i.e., San Francisco) as the site name, while the text labels 18 for the chapters 14 are more specific site names (i.e., Museum A, Restaurant B, and Theater C). Hence, in the case of this video summary, each video sequence is associated with the site name corresponding to where the video sequence was recorded.

Figure 3:
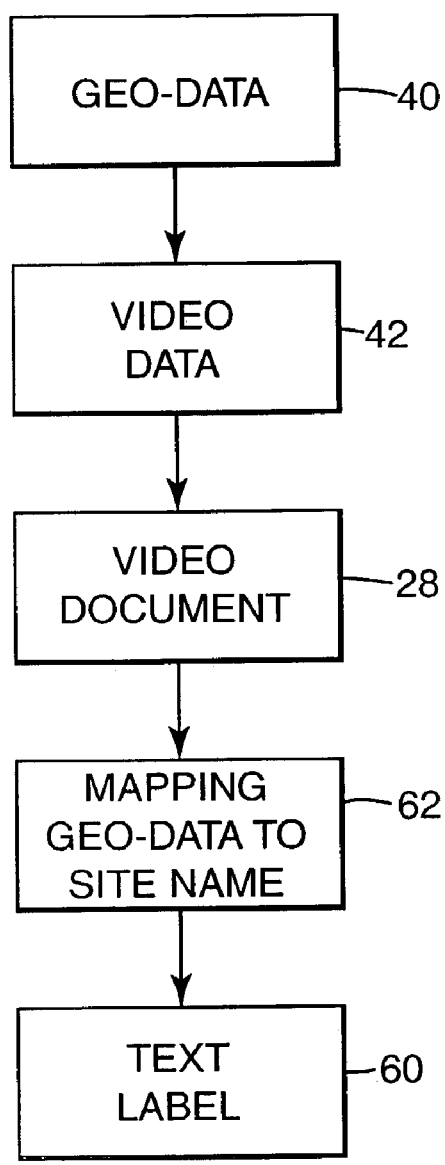
FIG. 3 is an exemplary flow diagram of the automatic creation of annotations of a video summary according to one embodiment of the present invention.

The site where a video sequence was recorded can be determined by associating a geographic location with the video sequence. In one embodiment as shown in FIG. 3, geographic location data 40 associated with the location where the video sequence is taken is integrated into the steam of video data 42, such that at least a portion of the video data 42 has associated geographic location data 40. The geographic location data 40 and video data 42 together create a video document 28. When video document 28 is processed by, for example, a computer, a site name 60 is determined or "mapped" from the geographic location data 40 (FIG. 3, box 62). The site name 60 is assigned as a text label 18 for the associated portion of video data 40.

In one embodiment, a geographic location is determined by using a global positioning system (GPS) receiving device. GPS receiving devices are well known and commonly available. GPS receiving devices rely on a constellation of orbiting navigation satellites which provide highly accurate signals which may be triangulated by the GPS receiving device to determine a geographic location of the receiving device. Means other than GPS may also be used for determining a geographic location. For example, another satellite navigation system is the Global Orbiting Navigation Satellite System (GLONASS), placed in orbit by the former Soviet Union and now maintained by the Russian Republic. Although the modes of operation of a GPS receiving device and a GLONASS receiving device differ slightly, they both ultimately function to provide the geographic location of the receiving device. Reference to GPS receiving devices herein are intended to include all systems capable of providing a geographic location to a user.

The site where the video sequence was taken can be associated with the video sequence by integrating the site's geographic location data (such as latitude and longitude obtained from a GPS receiving device) into the video data stream. The geographic location data (latitude and longitude in this case) may be integrated into the video data stream manually, semi-automatically, or automatically. For example, in one embodiment, the geographic location may be integrated manually by taking a reading from a GPS receiving device and manually entering the geographic coordinates into the video data stream via an appropriate input device, such as a keypad. In another embodiment, semi-automatic integration can be achieved by a user intermittently activating an input device (such as by pushing a button) that causes a current GPS reading to be automatically integrated into the video data stream at a user selected time. In still another embodiment, the geographic location data can be automatically integrated into the video data stream during video recording by providing a communications link between the GPS receiving device and the video recorder. In this type of a system, the geographic location data may be integrated continuously into the video data stream.

Figure 4:
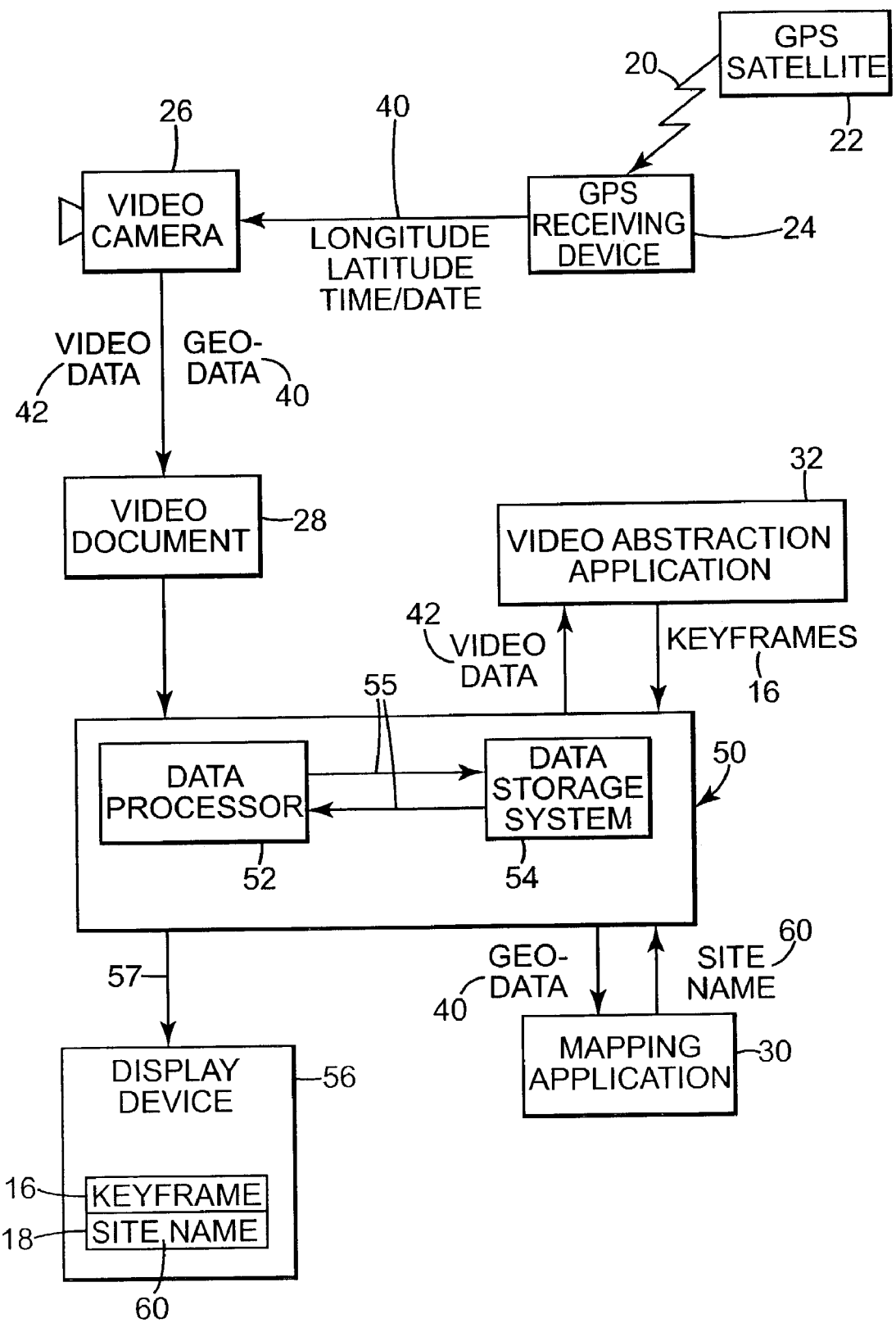
FIG. 4 is a schematic representation of one embodiment of a system for automatic creation of annotations for a video summary according to the invention.

FIG. 4 shows an embodiment of a system in which GPS information is integrated using a communications link between the GPS receiving device 24 and the video camera 26. During the videotaping process, geographic location coordinates are determined from orbiting GPS satellites 22. After receiving a signal 20 from a GPS satellite 22, the GPS receiving device 24 calculates the geographic location and communicates geographic location data 40 consisting of, for example, longitude, latitude and optionally time and date to a video camera 26. The geographic location data 40 is integrated into the stream of video data 42 from video camera 26 to create a video document 28. Video document 28 thus includes both geographic data 40 (provided by GPS receiving device 24) and video data 42 (provided by video camera 26).

Systems for integrating geographic location data into a document are known. For example, Eastman Kodak Company offers a system (available as their "DC265 Solution System for Global Positioning System") that automatically records longitude and latitude information along with the date and time into digital pictures. It should be understood any other appropriate system or receiving device 24 can be used to integrate geographic location data 40 into video document 28.

Video data 42 is provided to a video abstraction application 32 (FIG. 4), and keyframes 16 are extracted from the video data 42. In one embodiment of the invention, keyframes 16 representative of the underlying video content are selected from the video data 42 by video abstraction application 32 using techniques known in the art, such as described co-pending U.S. patent application Ser. No. 10/140,511, filed on May 7, 2002, and title "Scalable Video Summarization and Navigation System and Method," commonly assigned herewith and incorporated by reference.

Figure 5:
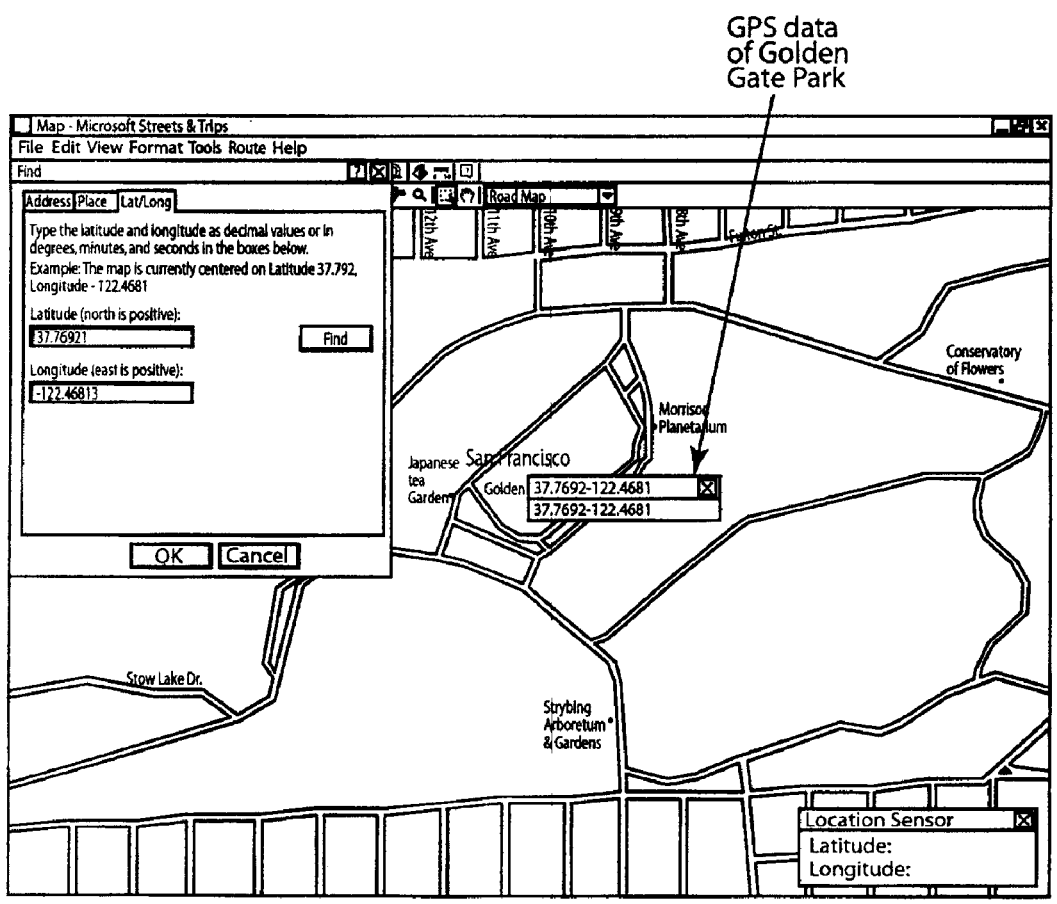
FIG. 5 shows an example of a user interface used to translate a geographic location to a map location.

The geographic location data 40 from video document 28 is provided to a mapping application 30 (FIG. 4) to determine a map location and a meaningful site name 60 from the geographic location data 40. Depending upon the level of abstraction and/or the availability of a specific location name (such as Museum A, Restaurant B, Theater C, Park D, etc.), the map location itself may be used as the site name 60 to annotate the keyframes 16 in the video summary. The translation from a geographic location to a map location and site name may be achieved by available software applications such as Microsoft® Streets and Trips, available from Microsoft Corporation. In the context of the imaginary San Francisco tour described above, FIG. 5 illustrates a user interface using the Microsoft Streets and Trips software application that provides a map location and a site name (i.e., the Golden Gate Park) when given the global positioning system data (latitude and longitude). Of course, other similar mapping applications 30 may also be used to convert a geographic location to a map location and site name.

Figure 6:
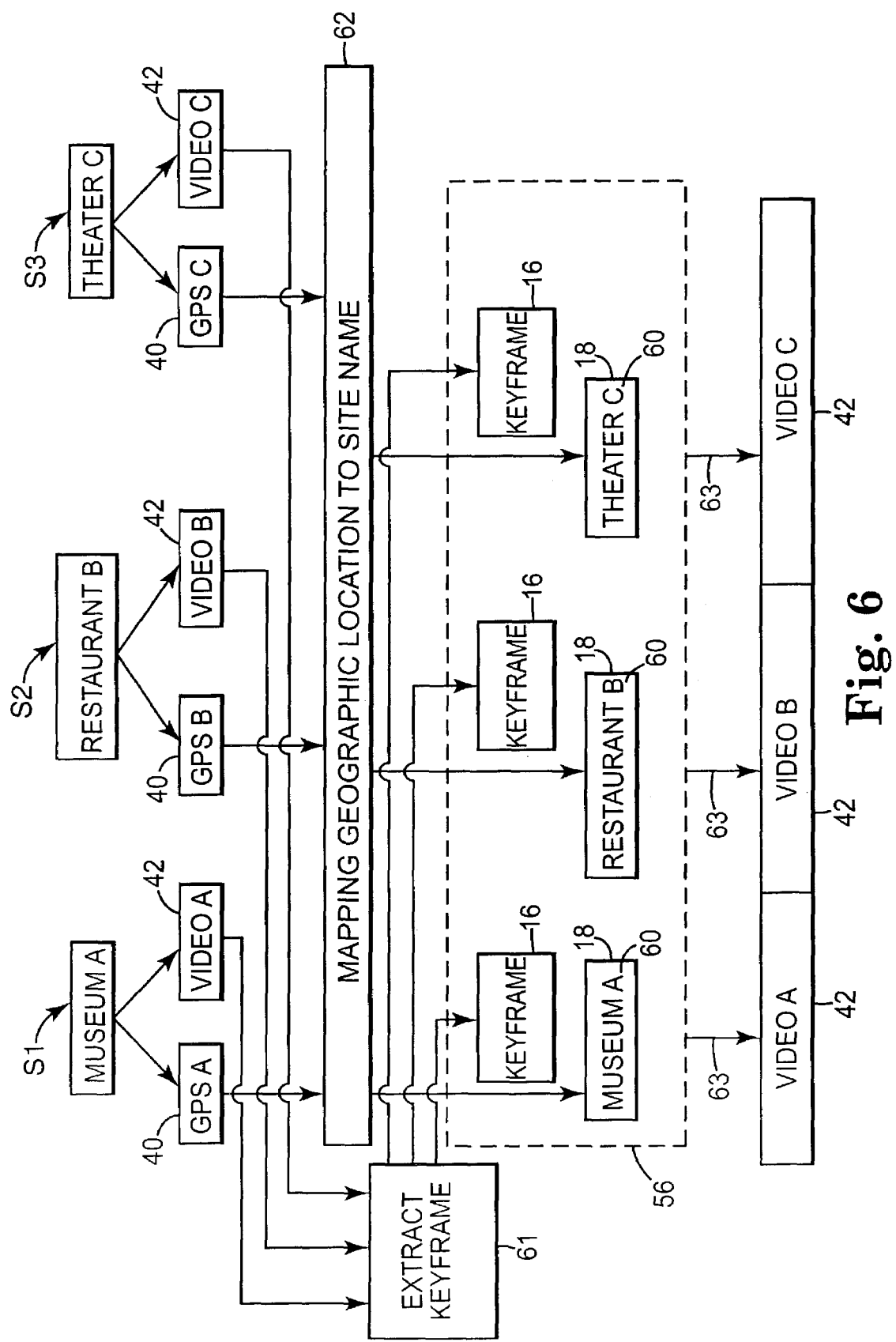
FIG. 6 is an exemplary flow diagram of the automatic creation of annotations of a video summary according to another embodiment of the present invention.

Referring to FIGS. 4 and 6, a text label 18 is created to annotate a video sequence or a keyframe 16 corresponding to the video sequence. Specifically, sites S1–S3, (i.e. Museum A, Restaurant B, and Theater C) at which video sequences VIDEO A, VIDEO B, and VIDEO C are taken have associated geographic location data 40 (i.e., GPS A, GPS B, and GPS C). The geographic location data 40 is integrated with the video data 42 which makes up the video sequences to create a video document 28 (not shown in FIG. 6). When the video document 28 is processed by, for example, computer system 50 (FIG. 4), keyframes are extracted from the video data 42 (block 61, FIG. 6), and geographic location data 40 is mapped (block 62, FIG. 6) to obtain site names 60 for keyframes 16. As shown in FIG. 6, the site name 60 can be used as a text label 18 to annotate an extracted keyframe 16 when displayed on a display device 56. The user can then navigate a video document 28 including video sequences VIDEO A, VIDEO B, and VIDEO C by selecting one of the keyframes 16 or text labels 18 displayed on device 56 (such as by using a mouse and curser to select a desired keyframe 16 or text label 18) which, in turn, links (indicated by arrows 63) to its corresponding video data 42 (e.g., VIDEO A, VIDEO B, and VIDEO C).

The invention described herein thus automatically and intelligently creates text labels 18 for a video summary. The user is provided with a representative image (i.e., a keyframe 16) and a relevant label 18 corresponding to the video recording site which allows easy navigation of the underlying video document.

As schematically illustrated in FIG. 4, the system described herein may be implemented on a variety of computing platforms, such as a home computer 50 including a processor 52 and a data storage system 54. In one embodiment, processor 52 runs mapping application 30 and video abstraction application 32, although mapping application 30 and video abstraction application 32 can alternatively be executed by a separate processing system or device. The video document 28, mapping application 30, video abstraction application 32, and video summary can be stored in the data storage system 54. The data storage system 54 may be, either individually or in combination, a DVD disc, a hard disc drive or other persistent storage device, or the random access memory of the chosen platform. The data processor 52 communicates with data storage system 54 via communication links 55 to retrieve and/or store data including but not limited to geographic location data 40 and video data 42 as the data is needed to execute location mapping application 30 and video abstraction application 32.

The system further includes a display device 56 for allowing the user to view the keyframes 16 and text labels 18 which form the video summary. Display device 56 receives data from computer 50 via communication link 57 and may be, for example, a video monitor or a hard copy generated by a printer. In an embodiment where display device 56 is a video monitor, the user may select one of the keyframes 16 or text labels 18 displayed on display device 56 (such as by using a mouse and curser, or by use of a touch screen) which, in turn, links to the corresponding video data 42 (FIG. 6). The user may then view the selected video sequence (e.g., VIDEO A, VIDEO B, or VIDEO C) on display device 56.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the computer and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for annotating a video data stream, at least one portion of the video data stream having associated geographic location data, the method comprising:
   creating a video document by integrating geographic location data into the video data stream, wherein the video document comprises a plurality of video sequences and wherein each of the plurality of video sequences has associated geographic location data;
   organizing the video document into a title-and-chapter navigation structure, the navigation structure comprising at least one title and each title comprising at least one chapter, wherein each chapter is associated with at least one of the plurality of video sequences;
   extracting a plurality of keyframes from the video data stream each keyframe corresponding to one of the titles and chapters and having associated geographic location data;
   mapping a site name for each title and chapter from the geographic location data, wherein the site names for each title have a first level of abstraction, and wherein the site names for each chapter have a second level of abstraction different from the first level of abstraction; and
   automatically assigning the site name as a text label to each keyframe of each title and chapter.

2. The method of claim 1, wherein mapping the geographic location data farther comprises translating the geographic location data to map location data and extracting the site name from the map location.

3. A method for creating a text label for a video sequence comprising:
   integrating geographic location data into a video data stream;
   organizing the video data stream into a title-and-chapter navigation structure, the navigation structure comprising at least one title and each title comprising at least one chapter;
   extracting a plurality of keyframes from the video data stream, each keyframe corresponding to one of the titles and chapters and having associated geographic location data;
   determining a site name for each title and chapter using the geographic location data, wherein the site names for each title have a first level of abstraction, and wherein the site names for each chapter have a second level of abstraction different from the first level of abstraction; and
   using the site names as a text label for the keyframes corresponding to each title and chapter.

4. The method of claim 3, wherein determining a site name using the geographic location data includes providing the geographic location data to a mapping application.

5. The method of claim 3, further comprising interfacing a video camera with a global positioning system receiving device to provide geographic location data to the video data stream.

6. The method of claim 3, wherein integrating geographic location data includes recording latitude and longitude data in the video data stream.

7. The method of claim 3, wherein integrating geographic location data includes manually entering geographic location data into the video data stream.

8. The method of claim 3, wherein integrating geographic location data includes automatically entering geographic location data into the video data stream.

9. The method of claim 3, wherein integrating geographic location data comprises continuously integrating geographic location data into the video data stream.

10. A method for creating a summarization of a video document comprising:
    organizing video data having associated geographic location data into a tide-and-chapter navigation structure, the navigation structure comprising at least one title and each title comprising at least one chapter;
    extracting a plurality of keyframes from the video data, each keyframe associated with a corresponding one of the titles and chapters;
    determining a site name for each of the extracted keyframes using the associated geographic location data, wherein the site names for keyframes associated with the tides have a first level of abstraction, and wherein the site names for keyframes associated with the chapter have a second level of abstraction different from the first level of abstraction; and
    annotating the extracted keyframes with the corresponding site name.

11. The method of claim 10, further comprising:
    recording a video data stream; and
    integrating geographic location data into the video data stream during recording.

12. The method of claim 11, wherein integrating geographic location data into the video data stream during recording includes integrating geographic location data continuously into the video data stream.

13. The method of claim 11, wherein integrating geographic location data into the video data stream during recording includes integrating geographic location data intermittently into the video data stream.

14. The method of claim 11, wherein integrating geographic location data into the video data stream during recording includes:
    receiving a GPS signal from a GPS satellite; and
    calculating a geographic location from the GPS signal.

15. The method of claim 10, wherein determining a site name using the geographic location data includes providing the geographic location data to a mapping application.

16. A video summarization and annotation system comprising:
    a processor for organizing a video document having geographic location data integrated into the video document into a title-and-chapter navigation structure, the navigation structure comprising at least one tide and each title comprising at least one chapter, extracting a plurality of keyframes from the video document, each keyframe associated with a corresponding one of the titles and chapters, and for mapping a site name for each keyframe using the integrated geographic location data, wherein the site names for keyframes associated with the titles have a first level of abstraction, and wherein the site names for keyframes associated with the chapter have a second level of abstraction different from the first level of abstraction;

a data storage system in communication with the processor for storing the extracted keyframes and corresponding site names as a video summary; and a display device for displaying the video summary.

17. The system of claim 16, further comprising:

a video camera; and a global positioning system communicating with the video camera and providing geographic location data to the video camera.

18. The system of claim 16, wherein the data storage system includes a DVD disc, a hard disc drive, or other persistent storage device.

19. The system of claim 16, wherein the display device comprises a video monitor.

20. A computer readable medium containing instructions for controlling a computer system to perform a method for annotating a video summarization comprising:

organizing video data having associated geographic location data into a title-and-chapter navigation structure, the navigation structure comprising at least one title and each title comprising at least one chapter;

extracting a plurality of keyframes from the video data, each keyframe associated with a corresponding one of the titles and chapters;

mapping a site name for each of the extracted keyframes using the geographic location data, wherein the site names for keyframes associated with the titles have a first level of abstraction, and wherein the site names for keyframes associated with the chapter have a second level of abstraction different from the first level of abstraction; and annotating extracted keyframes with the corresponding site name.

21. The method of claim 20, wherein mapping a site name using the geographic location data includes providing the geographic location data to a mapping application.

* * * * *

UNITED STATES PATENT AND TRADEMARK OFFICE
CERTIFICATE OF CORRECTION

PATENT NO. : 7,334,186 B2
APPLICATION NO. : 10/426775
DATED : February 19, 2008
INVENTOR(S) : Peng Wu It is certified that error appears in the above-identified patent and that said Letters Patent is hereby corrected as shown below:

In column 2, line 7, delete "1" and insert -- 11 --, therefor.

In column 7, line 42, in Claim 2, delete "farther" and insert -- further --, therefor.

In column 8, line 20, in Claim 10, delete "tide-and-chapter" and insert -- title-and-chapter --, therefor.

In column 8, line 29, in Claim 10, delete "tides" and insert -- titles --, therefor.

In column 8, line 60, in Claim 16, delete "tide" and insert -- title --, therefor.

In column 10, line 14, in Claim 20, after "annotating" insert -- the --.

Signed and Sealed this

Twenty-second Day of July, 2008

JON W. DUDAS
*Director of the United States Patent and Trademark Office*